(12) United States Patent
Iwasaki et al.

(10) Patent No.: US 12,120,275 B2
(45) Date of Patent: Oct. 15, 2024

(54) IMAGE FORMING SYSTEM HAVING FUNCTION OF INSPECTING SHEET, METHOD OF CONTROLLING SAME, AND STORAGE MEDIUM

(71) Applicant: CANON KABUSHIKI KAISHA, Tokyo (JP)

(72) Inventors: Shin Iwasaki, Chiba (JP); Hiroyuki Eda, Ibaraki (JP); Hiromi Shimura, Ibaraki (JP); Yuya Ohta, Chiba (JP); Rumi Konno, Ibaraki (JP); Yuko Shimpo, Ibaraki (JP); Yuga Yamauchi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 459 days.

(21) Appl. No.: 17/572,754

(22) Filed: Jan. 11, 2022

(65) Prior Publication Data

US 2022/0239788 A1    Jul. 28, 2022

(30) Foreign Application Priority Data

Jan. 22, 2021   (JP) .................................. 2021-008889

(51) Int. Cl.
*H04N 1/00* (2006.01)
*G03G 15/00* (2006.01)

(52) U.S. Cl.
CPC ..... *H04N 1/00092* (2013.01); *G03G 15/5062* (2013.01); *H04N 1/00029* (2013.01); *H04N 1/00633* (2013.01); *H04N 1/00917* (2013.01)

(58) Field of Classification Search
None
See application file for complete search history.

(56) References Cited

U.S. PATENT DOCUMENTS 9,505,581 B2   11/2016   Kai et al.
9,776,449 B2   10/2017   Shimura et al.
(Continued)

FOREIGN PATENT DOCUMENTS

JP   2012-236281 A   12/2012
JP   2013-186435 A    9/2013
(Continued)

OTHER PUBLICATIONS

Sep. 3, 2024 Japanese Official Action in Japanese Patent Appln. No. 2021-008889.

*Primary Examiner* — Dov Popovici
(74) *Attorney, Agent, or Firm* — Venable LLP

(57) ABSTRACT

An image forming system including a printer that forms an image on a sheet and an inspection apparatus that inspects an image on a sheet delivered from the printer. A discharge mode for discharging a sheet inspected by the inspection apparatus and binding processing for binding a plurality of sheets as one bundle are set on a console panel. In a case where a first mode for discharging a first sheet determined as normal by the inspection apparatus to a first discharge destination, discharging a second sheet determined as defective by the inspection apparatus to a second discharge destination different from the first discharge destination, and discharging a third sheet conveyed subsequently to the second sheet, determined as normal by the inspection apparatus, to the first discharge destination is set as the discharge mode, and the binding processing is set, execution of the corresponding job is stopped.

16 Claims, 11 Drawing Sheets

(56) References Cited

U.S. PATENT DOCUMENTS

| | | | |
|---|---|---|---|
| 10,538,406 B2 * | 1/2020 | Ohta | ............. B65H 37/04 |
| 10,623,587 B2 | 4/2020 | Tsukamoto | |
| 2003/0133721 A1 | 7/2003 | Brewington | |
| 2012/0288311 A1 | 11/2012 | Hosoda | |
| 2018/0157446 A1 * | 6/2018 | Fukuda | ............. G06K 15/16 |
| 2019/0238685 A1 | 8/2019 | Tsukamoto | |
| 2020/0210115 A1 * | 7/2020 | Igawa | ............. G03G 15/5012 |

FOREIGN PATENT DOCUMENTS

| | | |
|---|---|---|
| JP | 2018-089869 A | 6/2018 |
| JP | 2018-126868 A | 8/2018 |
| JP | 2019-093550 A | 6/2019 |
| JP | 2019-132966 A | 8/2019 |
| JP | 2020-104384 A | 7/2020 |

\* cited by examiner

IMAGE FORMING SYSTEM HAVING FUNCTION OF INSPECTING SHEET, METHOD OF CONTROLLING SAME, AND STORAGE MEDIUM

BACKGROUND OF THE INVENTION

Field of the Invention

The present disclosure relates to an image forming system having a function of inspecting a sheet, a method of controlling the same, and a storage medium.

Description of the Related Art

Conventionally, there has been known an image forming system having a function of inspecting a sheet on which an image has been printed. When inspecting a sheet, an inspection apparatus reads an image on a sheet conveyed thereto, and whether or not the sheet is normal is determined based on analysis of the read image. The inspection apparatus is capable of detecting incompleteness of a barcode or ruled lines, incompleteness of an image, printing failure, page missing, color misregistration, and so forth. Japanese Laid-Open Patent Publication (Kokai) No. 2018-126868 discloses a technique in which, in a case where an inspected sheet is determined as a "defective sheet" which is not normal, this defective sheet is discharged to a discharge destination different from a discharge destination to which a normal sheet is discharged. This makes it possible to prevent a defective sheet from being mixed into normal sheets, and an operator can easily abandon the defective sheet.

Incidentally, for processing operations, such as a discharging operation, executed in a case where a defective sheet is produced, a plurality of processing operations can be envisaged. For example, as a first method, a method is envisaged in which only a defective sheet is discharged to another discharge destination, and the print operation for subsequent sheets in a job is continued. Further, as a second method, a method is envisaged in which a normal sheet is discharged to a discharge destination for a normal sheet, and a defective sheet and sheets which have already been fed for printing after this defective sheet are discharged to another discharge destination. In this second method, after discharge of all sheets for the job, which have already been fed, is completed, the job operation is resumed from a point corresponding to the defective sheet. Further, it is envisaged that a user is allowed to select between these two methods.

On the other hand, in the image forming system, processing for binding a plurality of sheets, such as saddle-stitch bookbinding or stapling, is sometimes carried out. In a case where a job including such processing for binding sheets is processed using the first method, a normal sheet is discharged to the discharge destination for a normal sheet, and a defective sheet is discharged to another discharge destination. However, since the job is continued from a sheet following the defective sheet, a bundle formed only by normal sheets is obtained as a print product. In other words, the bundle missing a page corresponding to the defective sheet (part of sheets) is delivered as the print product. In this case, it is impossible to provide a print product desired by a user.

SUMMARY OF THE INVENTION

The present disclosure provides an image forming system that has a function of inspecting a sheet and is configured to prevent a print product from being formed by binding a bundle of sheets from which one or some sheets is/are missing, a method of controlling the image forming system, and a storage medium.

In a first aspect of the present invention, there is provided an image forming system including an image forming portion configured to form an image on a sheet, an inspection portion configured to inspect an image on a sheet delivered from the image forming portion, a first setting portion configured to set a first mode in which a first sheet determined as normal by the inspection portion is discharged to a first discharge destination, a second sheet determined as not normal by the inspection portion is discharged to a second discharge destination different from the first discharge destination, and a third sheet conveyed subsequently to the second sheet, which is determined as normal by the inspection portion, is discharged to the first discharge destination, a second setting portion configured to set binding processing for binding a plurality of sheets as one bundle, and a controller configured to stop execution of a job in a case where the first setting portion sets the first mode and also the second setting portion sets the binding processing.

In a second aspect of the present invention, there is provided an image forming system including an image forming portion configured to form an image on a sheet, an inspection portion configured to inspect an image on a sheet output from the image forming portion, a first setting portion configured to set a first mode in which a first sheet determined as normal by the inspection portion is discharged to a first discharge destination, a second sheet determined as not normal by the inspection portion is discharged to a second discharge destination different from the first discharge destination, and a third sheet conveyed subsequently to the second sheet, which is determined as normal by the inspection portion, is discharged to the first discharge destination, a second setting portion configured to set binding processing for binding a plurality of sheets as one bundle, and a controller configured to control the second setting portion such that the second setting portion is disabled from setting the binding processing in a case where the first setting portion sets the first mode.

In a third aspect of the present invention, there is provided a method of controlling an image forming system including an image forming portion configured to form an image on a sheet, and an inspection portion configured to inspect an image on a sheet delivered from the image forming portion, including first receiving for receiving setting of a mode in which a first sheet determined as normal by the inspection portion is discharged to a first discharge destination, a second sheet determined as not normal by the inspection portion is discharged to a second discharge destination different from the first discharge destination, and a third sheet conveyed subsequently to the second sheet, which is determined as normal by the inspection portion, is discharged to the first discharge destination, second receiving for receiving setting of binding processing for binding a plurality of sheets as one bundle, and controlling for stopping execution of transmission of a job to the image forming system, in a case where, in the first receiving, there is received setting of the mode and also in the second receiving, there is received setting of the binding processing.

In a fourth aspect of the present invention, there is provided a method of controlling an image forming system including an image forming portion configured to form an image on a sheet, and an inspection portion configured to inspect an image on a sheet delivered from the image forming portion, including first receiving for receiving setting of a mode in which a first sheet determined as normal by the inspection portion is discharged to a first discharge destination, a second sheet determined as not normal by the inspection portion is discharged to a second discharge destination different from the first discharge destination, and a third sheet conveyed subsequently to the second sheet, which is determined as normal by the inspection portion, is discharged to the first discharge destination, second receiving for receiving setting of binding processing for binding a plurality of sheets as one bundle, and controlling for disabling, in the second receiving, receiving the setting of the binding processing, in a case where, in the first receiving, there is received setting of the mode.

According to the present invention, it is possible to prevent a print product form being formed by binding a bundle of sheets from which one or some sheets is/are missing.

Further features of the present invention will become apparent from the following description of exemplary embodiments (with reference to the attached drawings).

DESCRIPTION OF THE EMBODIMENTS

The present closure will now be described in detail below with reference to the accompanying drawings showing embodiments thereof.

Figure 1:
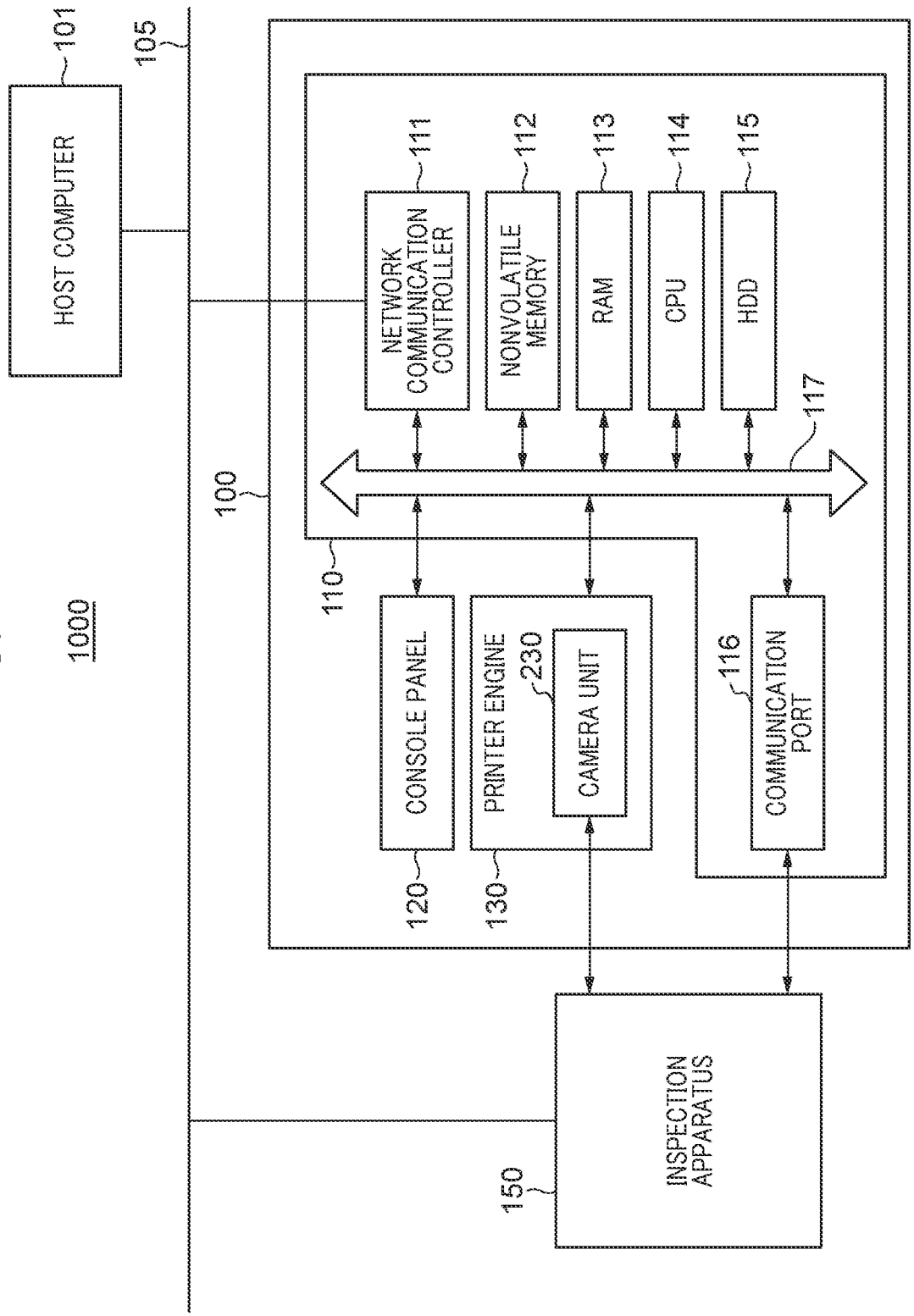
FIG. 1 is a schematic block diagram of an image forming system.

FIG. 1 is a schematic block diagram of an image forming system (hardware) according to a first embodiment of the present disclosure. This image forming system, denoted by reference numeral 1000, is mainly comprised of a printing apparatus 100, a host computer 101, and an inspection apparatus 150. The printing apparatus 100, the host computer 101, and the inspection apparatus 150 are interconnected by a communication line 105. Although the host computer 101, the printing apparatus 100, and the inspection apparatus 150 are singly provided for the image forming system 1000, they may be provided in plurality.

The host computer 101 acquires information input by a user using an input device, not shown, generates a print job, and transmits the generated print job to the printing apparatus 100. The printing apparatus 100 includes a controller 110, a console panel 120, and a printer engine 130. The printer engine 130 includes a camera unit 230. The controller 110 performs a variety of data processing and controls the operation of the printing apparatus 100. Although the controller 110 is incorporated in the printing apparatus 100 in the present example, the controller 110 can be provided independently of the printing apparatus 100 and connected thereto via a communication line.

The console panel 120 is an operation panel of a touch panel type that receives a variety of operations from a user and displays a variety of information to a user. The printer engine 130 is controlled by the controller 110 to physically print generated image data on a print sheet. The printer engine 130 will be described in detail hereinafter with reference to FIG. 2.

The inspection apparatus 150 is an apparatus configured to perform image inspection using a photographed image obtained by photographing a sheet by the camera unit 230. The inspection apparatus 150 is connected to the communication line 105 and receives inspection item settings, a comparison source image, and so forth, from the host computer 101.

Next, the configuration of the controller 110 will be described. The controller 110 includes a network communication controller 111, a nonvolatile memory 112, a RAM 113, a CPU 114, an HDD 115, and a communication port 116, and these modules are interconnected via a system bus 117. The network communication controller 111 controls communication with an external network connected to the communication line 105. The nonvolatile memory 112 is a nonvolatile storage device and stores a control program used when starting the apparatus, and so forth. The RAM 113 stores a variety of control programs read by the CPU114. The CPU 114 executes the control programs loaded into the RAM 113 and performs centralized control of image signals and a variety of devices. The HDD 115 holds large-volume data, such as image data and a variety of setting data items, temporarily or on a long-term basis. The communication port 116 is a port for receiving electrical signals indicating an inspection result from the inspection apparatus 150.

The system bus 117 connects the controller 110 and the devices included in the printing apparatus 100 with each other. Note that the RAM 113 also functions as a main memory and a work memory for the CPU 114. Further, the control programs and an operating system are sometimes stored not only in the nonvolatile memory 112, but also in the HDD 115. Further, the controller 110 may include an NVRAM, not shown, and store mode setting information of the printer, which is received from the console panel 120.

Figure 2:
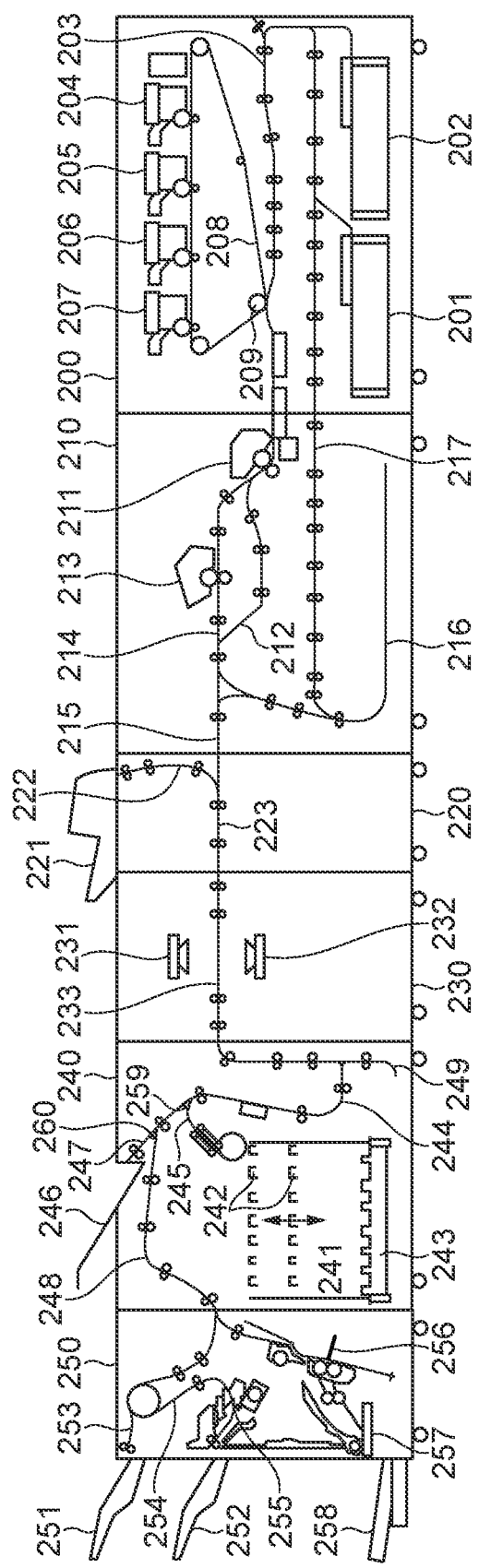
FIG. 2 is a schematic cross-sectional view of a printer engine.

FIG. 2 is a schematic cross-sectional view of the printer engine 130 of the printing apparatus 100. The printer engine 130 is realized mainly by component elements included in an image forming unit 200, an image fixing unit 210, an inserter 220, the camera unit 230, a stacker 240, and a finisher (post-processing apparatus) 250. The image forming unit 200 is disposed at a location most upstream in a sheet conveying direction and the finisher 250 is disposed at a location most downstream in the sheet conveying direction.

The image forming unit 200 and the image fixing unit 210 form an image forming portion. The image forming unit 200 includes four developing stations 204 to 207, an intermediate transfer belt 208 arranged under these stations, a sheet conveying path 203, and sheet feeding decks 201 and 202. A secondary transfer roller 209 is disposed at a location where the intermediate transfer belt 208 is brought into contact with the sheet conveying path 203, and this position serves as a secondary transfer position.

The sheet feeding decks 201 and 202 each accommodate one of a variety of kinds of sheets. The sheet feeding decks 201 and 202 each separate a topmost sheet of an sheet bundle accommodated therein, one by one, and delivers the sheet into the sheet conveying path 203. The developing stations 204 to 207 form toner images using color toners of e.g. Y(yellow), M (magenta), C (cyan), and B (black), respectively. The formed toner images are primarily transferred onto the intermediate transfer belt 208, respectively, whereby a superposed color image is formed.

The intermediate transfer belt 208 is rotated in a clockwise direction, as viewed in FIG. 2, and the toner image transferred onto the intermediate transfer belt 208 is transferred onto a sheet conveyed to the secondary transfer position from the sheet conveying path 203. The sheet on which the toner image has been transferred is conveyed out of the image forming unit 200 into the image fixing unit 210 disposed on the downstream side.

The image fixing unit 210 fixes the toner image transferred onto the sheet thereto. The image fixing unit 210 includes a sheet conveying path 214 connected to the sheet conveying path 203 of the image forming unit 200, and a first fixing unit 211 and a second fixing unit 213 provided on the sheet conveying path 214.

Further, the image fixing unit 210 includes a sheet conveying path 212 that is branched from the sheet conveying path 214 on the downstream side of the first fixing unit 211 and bypasses the second fixing unit 213. Further, the image fixing unit 210 includes a sheet conveying path 215 on the downstream side of the sheet conveying path 214, a sheet inversion path 216 branched from the sheet conveying path 214, and a double-sided conveying path 217 connected to the sheet inversion path 216. The fixing units 211 and 213 each include a pressure roller and a heating roller, and fix, when a sheet passes between the rollers, a toner image on the sheet by melting and pressing toner.

The sheet that has been conveyed in from the image forming unit 200 and has the toner image fixed by the first fixing unit 211 is conveyed into the sheet conveying path 215 through the sheet conveying path 212. In a case where the melting and pressing operations are further required so as to fix an image depending on a type of the sheet, the sheet is conveyed to the second fixing unit 213 after passing through the first fixing unit 211, where the sheet is subjected to additional melting and pressing operations. Then, the sheet is conveyed into the sheet conveying path 215 through the sheet conveying path 214.

In a case where an image formation mode is set to a double-sided printing mode, the sheet is conveyed into the sheet inversion path 216 to have front and reverse sides thereof inverted, whereafter the sheet is conveyed through the double-sided conveying path 217 to the secondary transfer position, where an image is transferred onto the second side.

The inserter 220 disposed on the downstream side of the image fixing unit 210 is a unit for inserting a new sheet (for insertion) into the sheet conveying path. The inserter 220 includes an inserter tray 221 and an inserter path 222. The inserter 220 causes a sheet from the inserter tray 221 to be conveyed through the inserter path 222 and join sheets conveyed through a sheet conveying path 223 connected to the sheet conveying path 215 of the image fixing unit 210. This makes it possible to insert a new sheet in a group of sheets conveyed in from the image fixing unit 210 at a desired position and convey the combined sheets to a subsequent apparatus. The inserter tray 221 accommodates sheets to be inserted into the group of sheets.

The sheet having passed the inserter 220 is conveyed to the camera unit 230 disposed on the downstream side of the inserter 220. The camera unit 230 includes a sheet conveying path 233 connected to the sheet conveying path 223 of the inserter 220, and cameras 231 and 232 disposed above and under the sheet conveying path 233, respectively, in a state opposed to each other. The camera 231 is a camera for reading an upper surface of a sheet, and the camera 232 is a camera for reading a lower surface of the sheet. The camera unit 230 reads images on a sheet using the cameras 231 and 232 when the sheet conveyed into the sheet conveying path 233 reaches a predetermined position, and transmits the read sheet images to the inspection apparatus 150 (see FIG. 1).

The stacker 240 disposed on the downstream side of the camera unit 230 is a large-capacity stacker which can stack a large amount of sheets. The stacker 240 includes sheet conveying paths 244, 245, 247, and 248, and an inversion portion 249, and a stack tray 241 as a tray for stacking sheets. The stack tray 241 has a lift table 242 and an eject table 243.

The sheet having passed the camera unit 230 is conveyed into the stacker 240 through the sheet conveying path 244. The sheet conveyed into the stacker 240 is stacked onto the lift table 242 of the stack tray 241 from the sheet conveying path 244 through the sheet conveying path 245. The lift table 242 with no sheet bundle stacked thereon is in a top position indicated in FIG. 2. When stacking of a sheet bundle progresses, the lift table 242 is moved down by an amount corresponding to the height of the sheet bundle, and is controlled such that an upper end of the stacked sheet bundle is always maintained at a constant level.

In a case where the stacking of the sheet bundle is completed or the sheet bundle is fully stacked, the lift table 242 is moved down to the position of the eject table 243. The lift table 242 and the eject table 243 are configured such that bars of the tables 242 and 243 for supporting a sheet bundle are located alternately between the tables 242 and 243, and hence when the lift table 242 is moved down and reaches a position lower than the eject table 243, the sheet bundle is transferred onto the eject table 243.

Further, the stacker 240 has an escape tray 246 as a discharge tray. The escape tray 246 is a tray used to discharge a sheet determined to be not normal (hereinafter referred to as the defective sheet) by the inspection apparatus 150. That is, the escape tray 246 is a destination where defective sheets are discharged. Note that the defective sheet refers to a sheet that has an image transferred thereon which is different from an image to be formed on the sheet. For example, the defective sheet includes a sheet in which part of an image, such as a barcode, is missing, and a sheet having printed contents which are different from an image which is to be formed.

The discharge destination of an inspected sheet is switched by flappers 259 and 260. A defective sheet is conveyed from the sheet conveying path 244 to the escape tray 246 through the sheet conveying path 247. Further, in a case where a sheet is to be conveyed to the finisher 250 disposed on the downstream side of the stacker 240, the sheet is conveyed through the sheet conveying path 248. The inversion portion 249 for inverting a sheet is connected to the sheet conveying path 244.

The inversion portion 249 is used for stacking a sheet on the stack tray 241 after inverting upper and lower sides thereof. More specifically, if sheets are directly stacked on the stack tray 241, an order of sheets stacked in a bundle in a vertical direction associated with a facing orientation of each sheet becomes opposite to an original order of the sheets. For this reason, in a case where it is necessary to make these orders identical with each other, each sheet is once inverted (flipped) by the inversion portion 249 before being stacked on the stacker tray 241. In a case where a sheet is conveyed to the escape tray 246 or the subsequent finisher 250, the sheet is directly discharged without being flipped when stacked, and hence the inversion operation at the inversion portion 249 is not performed.

The finisher 250 disposed on the downstream side of the stacker 240 is a post-processing apparatus for applying finishing processing to a sheet conveyed thereto according to a function designated by a user. The finisher 250 has finishing functions, such as stapling (one-position stapling/two-position stapling), punching (two holes/three holes), and saddle-stitch bookbinding.

The finisher 250 includes sheet conveying paths 253, 254, and 257, connected to the sheet conveying path 248 of the stacker 240, discharge trays 251 and 252, and a saddle-stitch bookbinding tray 258. A sheet conveyed into the finisher 250 is discharged to the discharge tray 251 through the sheet conveying path 253, for example. However, in the sheet conveying path 253, finishing processing, such as stapling, is not performed. In a case where finishing processing, such as stapling, is performed, the sheet is conveyed into a processing section 255 through the sheet conveying path 254. Finishing processing designated by a user is performed on the sheets conveyed into the processing section 255, and then the processed sheets are discharged to the discharge tray 252.

The discharge trays 251 and 252 can be moved up and down, and sheets subjected to finishing processing at the processing section 255 can also be stacked on the discharge tray 251 which has been moved down. In a case where saddle-stitch bookbinding is designated, in a saddle-stitch processing section 256, stapling is performed at the center of sheets, and then the sheets are folded in two, and delivered to the saddle-stitch bookbinding tray 258 through the sheet conveying path 257. The saddle-stitch bookbinding tray 258 has a belt-conveyer structure, and a bundle subjected to saddle-stitch bookbinding and stacked on the saddle-stitch bookbinding tray 258 is conveyed out to the left, as viewed in FIG. 2.

The inspection apparatus 150 inspects a sheet image transmitted thereto according to inspection items set in advance. Although there are a variety of inspection items, the following description will be given of an example of performing barcode readability inspection and front-and-reverse sides-matching inspection, by way of example.

Figure 3A:
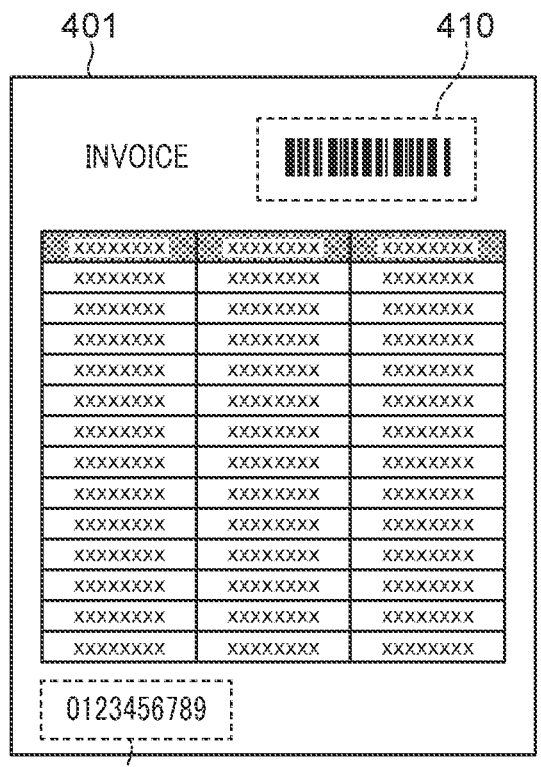
FIGS. 3A and 3B are schematic diagrams showing how sheet images are inspected by an inspection apparatus.
Figure 3B:
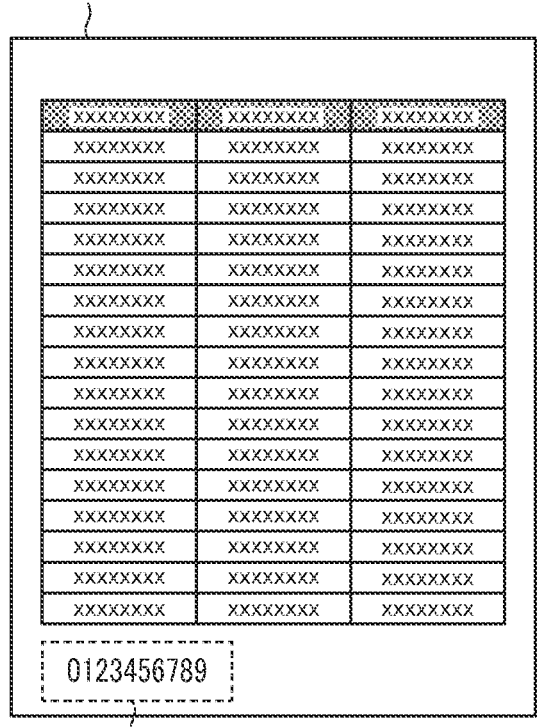

FIGS. 3A and 3B are schematic diagrams showing how transmitted sheet images are inspected by the inspection apparatus 150. A sheet image 401 shown in FIG. 3A is a sheet image obtained by reading an upper surface of a sheet, i.e. an image photographed by the camera 231. A sheet image 402 shown in FIG. 3B is a sheet image obtained by reading a lower surface of the sheet, i.e. an image photographed by the camera 232. In FIGS. 3A and 3B, reference numerals 410, 421, and 422 denote inspection areas to be inspected.

First, the inspection apparatus 150 determines whether or not a barcode existing in the inspection area 410 is readable. If the barcode is readable, the inspection apparatus 150 determines that the barcode has been normally printed, whereas if not, the inspection apparatus 150 determines that the print of the barcode has a defect.

Next, the inspection apparatus 150 performs optical character recognition (OCR) to extract values included in the inspection areas 421 and 422 as character data. Here, original data of a print job is assumed to be formed such that in a case where printing is normally performed, the same values are printed on front and reverse sides (upper and lower surfaces) of the sheet. With this, it is possible to determine whether or not printing has been performed on the front and reverse sides of the sheet as intended. If the same values are extracted from the inspection areas 421 and 422, it is determined that print is normal, whereas different values are extracted, it is determined that the print is defective.

The inspection apparatus 150 performs these inspections, and if it is determined by any of the inspections that the print is defective, the sheet is determined as a "defective sheet", whereas if no defect is detected by either of the inspections, the sheet is determined as a "normal sheet".

The inspection apparatus 150 is capable of performing not only the above-mentioned inspections, but also a variety of inspections, such as sheet print position inspection, sheet overlap inspection, sheet missing inspection, color misregistration inspection, color taste inspection, and inspection of full image comparison between a read image and original data. However, inspection items to be employed are not limited to these. Note that the above-mentioned inspection area and the inspection items are set for the inspection apparatus 150 from the host computer 101 or the like via the communication line 105. In a case where the full image comparison inspection is performed, the inspection apparatus 150 receives a comparison source image from the host computer 101 or the like. Further, as another configuration, the inspection apparatus 150 may be configured to include a console section for enabling a user to set an inspection area and an inspection item from the console section.

A sheet discharge mode (discharge mode) for discharging an inspected sheet will be described with reference to FIGS. 4A to 4D and 5. The sheet discharge mode has a first mode and a second mode. The first mode is a mode for discharging a normal sheet to a first discharge destination and discharging only a defective sheet to a second discharge destination. The second mode is a mode for discharging a normal sheet to the first discharge destination and discharging a defective sheet and subsequent sheets after the defective sheet (all sheets following the defective sheet) to the second discharge destination. Note that sheets to be discharged to the second discharge destination in the second mode may be limited to the defective sheet and subsequent sheets which have already been fed.

In both of the sheet discharge modes, the normal sheet is discharged to the first discharge destination, and the defective sheet is discharged to the second discharge destination which is a discharge destination different from the first discharge destination. In the present example, the first discharge destination is assumed to be the lift table 242 of the stacker 240. The second discharge destination is assumed to be the escape tray 246. Note that the first discharge destination may be the finisher 250. At least one of the first discharge destination and the second discharge destination may be made selectable by a user via the console panel 120 as a setting portion.

Figure 4A:
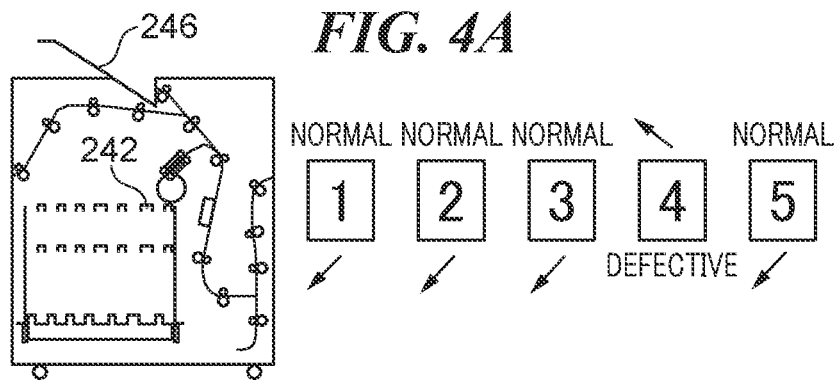
FIGS. 4A to 4D are schematic diagrams showing the outline of operation and a sheet discharge state of a first and a second modes.
Figure 4B:
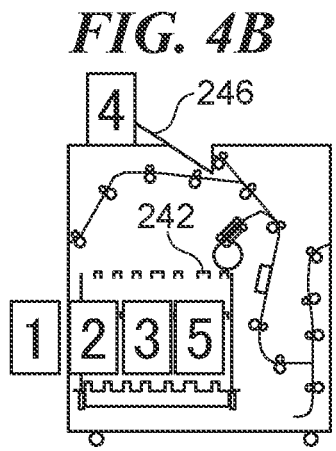
Figure 4C:
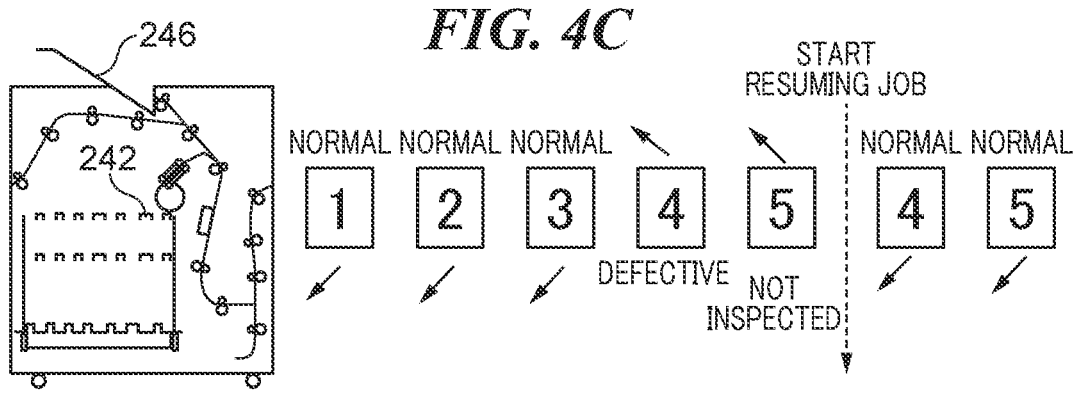
Figure 4D:
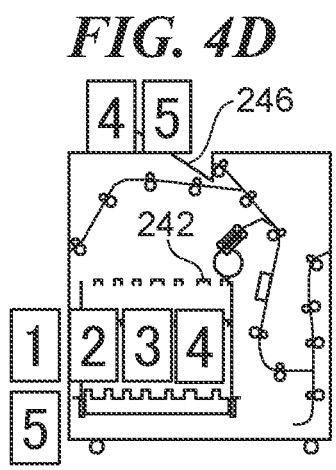

FIGS. 4A and 4B are schematic diagrams showing the outline of operation and a sheet discharge state in the first mode, respectively. FIGS. 4C and 4D are schematic diagrams showing the outline of operation and a sheet discharge state in the second mode, respectively.

In each sheet discharge mode, as shown in FIGS. 4A and 4C, image inspection is performed on each sheet by the inspection apparatus 150. An obliquely downward arrow in each of FIGS. 4A and 4C indicates that a sheet is determined as a normal sheet, and hence the sheet is discharged onto the lift table 242. An obliquely upward arrow in each of FIGS. 4A and 4C indicates that a sheet is determined as a defective sheet, and hence the defective sheet and subsequent sheets (in the case of FIG. 4C) are discharged onto the escape tray 246.

In the illustrated example in FIG. 4A, first to third and fifth sheets are normal sheets, and a fourth sheet is a defective sheet. In the first mode, when a defective sheet is detected, the defective sheet is discharged onto the escape tray 246, but the job is continued. Therefore, for example, as in the illustrated example in FIG. 4A, in a case where only the fourth sheet out of five sheets in the job is determined as a defective sheet, as shown in FIG. 4B, the first, second, third, and fifth normal sheets are discharged onto the lift table 242. On the other hand, the fourth defective sheet is discharged onto the escape tray 246, and the job is terminated in this state. In this case, the fourth sheet is not included in the print product stacked on the lift table 242. That is, the obtained print product is a sheet bundle missing the fourth sheet and is different from a print product desired by the user (see FIG. 4B).

In the illustrated example in FIG. 4C, first to third sheets are normal sheets, and a fourth sheet is a defective sheet. In the second mode, when a defective sheet is detected, the defective sheet is discharged onto the escape tray 246, and sheets after the defective sheet (all subsequent already fed sheets) are discharged onto the escape tray 246 without being inspected. Further, in the second mode, after all already fed sheets have been discharged, the job operation is resumed from a point corresponding to the defective sheet. In a case where a defective sheet is detected in the second mode, after all already fed sheets are discharged, the job is automatically resumed. Alternatively, the job may be resumed according to an instruction of restart.

In the illustrated example in FIG. 4C, the fifth sheet is not inspected, and hence the fifth sheet is treated similar to the defective sheet for the discharge destination. Further, the fourth and fifth sheets processed after restarting the job are normal sheets.

As described above, by restarting the job, if sheets after the defective sheet are determined as normal, the sheets are stacked on the lift table 242. Therefore, even in a case where, for example, the fourth sheet is determined as the defective sheet in the first execution of the job, all of the first to fifth sheets are eventually completed and stacked on the lift table 242. That is, the obtained print product has no missing sheet and matches a print product desired by the user (see FIG. 4D).

Figure 5:
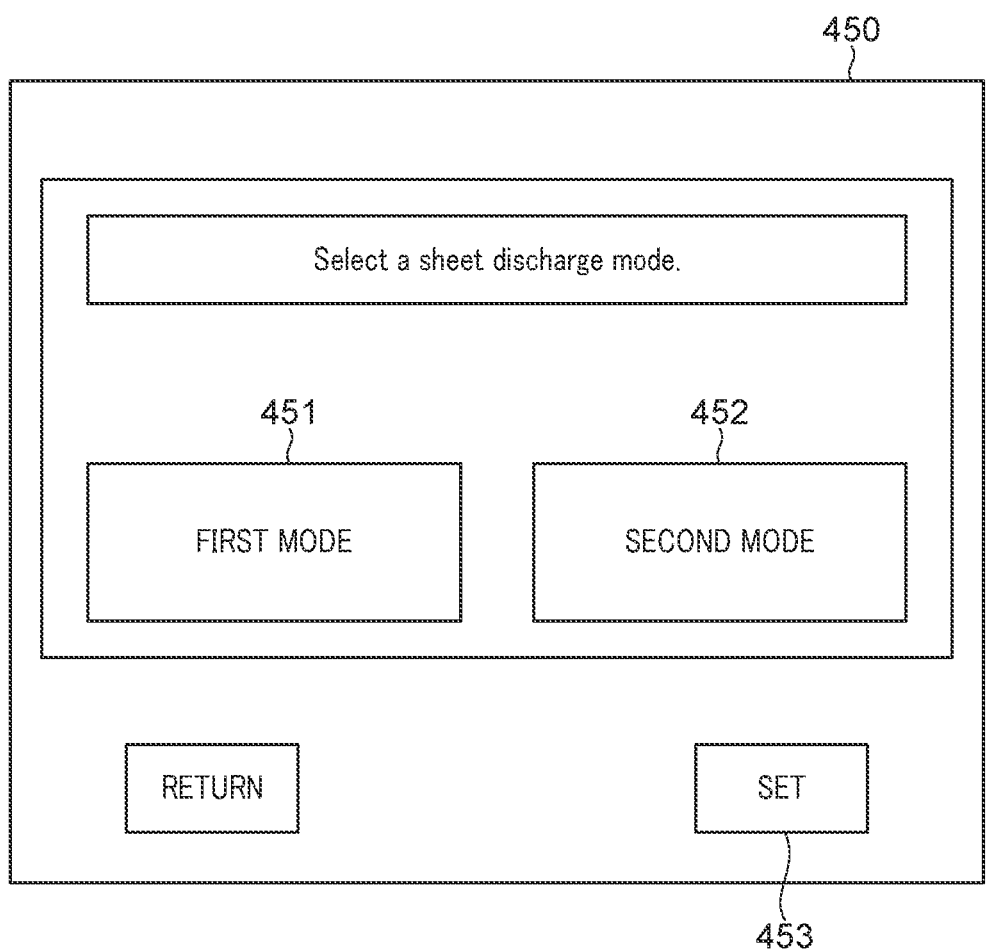
FIG. 5 is a diagram showing an example of a sheet discharge mode-setting screen.

FIG. 5 is a diagram showing an example of a sheet discharge mode-setting screen. This sheet discharge mode-setting screen, denoted by reference numeral 450, is displayed on the host computer 101 or the console panel 120. Therefore, the user can set the sheet discharge mode via the host computer 101 or the console panel 120. The sheet discharge mode-setting screen 450 has a first mode-setting button 451 and a second mode-setting button 452. When the user presses a determination button 453 in a state in which the user has selected one of the buttons 451 and 452, the user can set the sheet discharge mode. The set sheet discharge mode is stored in the nonvolatile memory 112.

Figure 6:
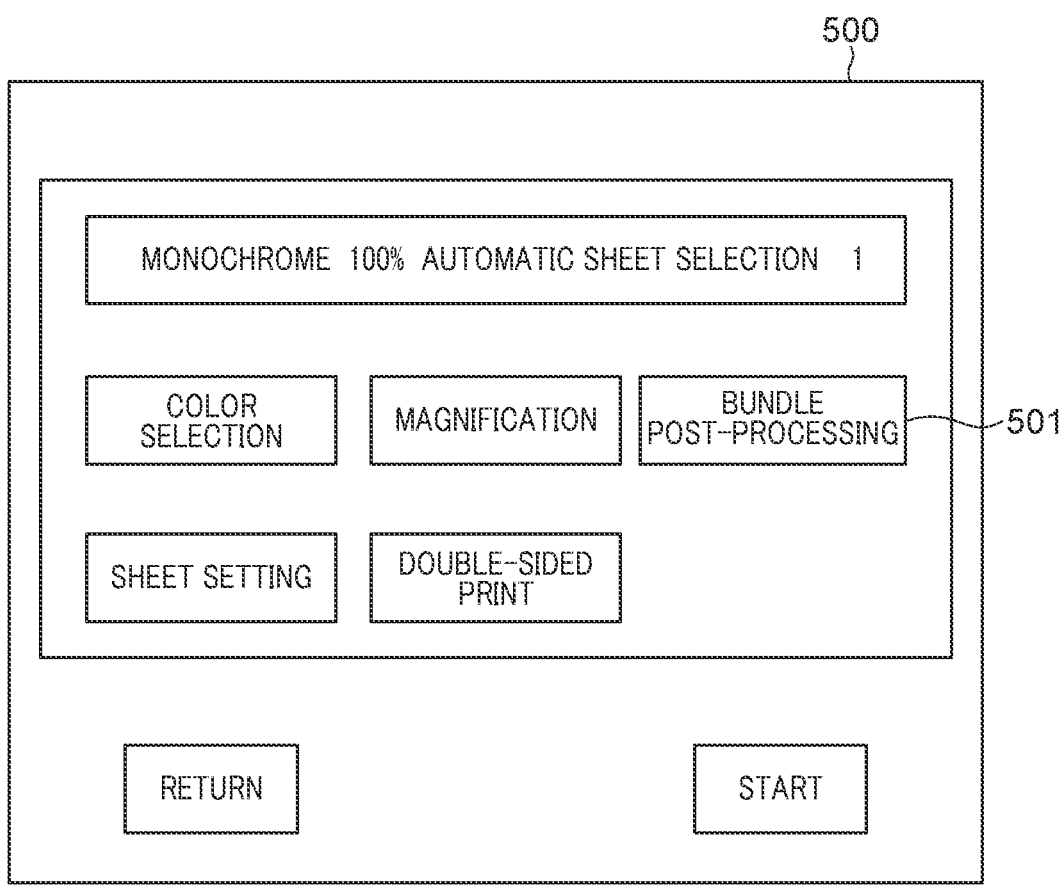
FIG. 6 is a diagram showing an example of an ordinary job-setting screen.

FIG. 6 is a diagram showing an example of an ordinary job-setting screen. A job to be executed is designated by a user via the console panel 120. In a case where the user desires to designate a job, in response to a predetermined operation performed by the user for shifting to the job setting screen, denoted by reference numeral 500, the job setting screen 500 is displayed on the console panel 120. A print job is generated based on information input by the user on the job setting screen 500. The job setting screen 500 displays a bundle post-processing-setting button 501. The bundle post-processing-setting button 501 activates bundle post-processing when it is pressed. The bundle post-processing is processing in which a plurality of sheets are handled as one bundle, such as bookbinding and stapling. In the present embodiment, as the bundle post-processing, binding processing for binding a plurality of sheets as one bundle is described by way of example. In a case where the user desires to apply bundle post-processing, the user can generate a job including bundle post-processing by pressing the bundle post-processing-setting button 501. Note that the setting of binding processing can also be set by the host computer 101.

Figure 7:
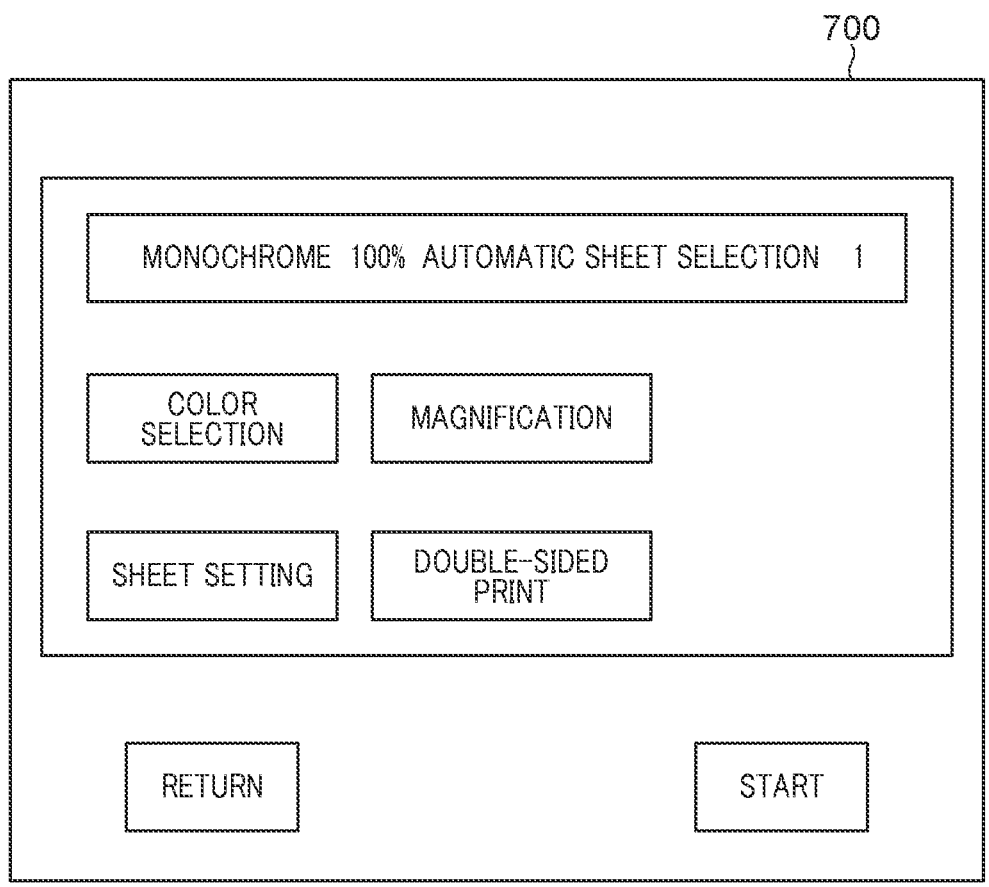
FIG. 7 is a diagram showing an example of a job setting screen displayed in a case where the first mode is set.

FIG. 7 is a diagram showing an example of a job setting screen displayed in a case where the first mode as the sheet discharge mode is set. This job setting screen, denoted by reference numeral 700, corresponds to a screen obtained by hiding (masking) the bundle post-processing-setting button 501 from the ordinary job-setting screen 500. In a case where the first mode is set as the sheet discharge mode, since the bundle post-processing-setting button 501 is not displayed, the user cannot designate a job including bundle post-processing.

Next, a process for controlling whether or not to display the bundle post-processing-setting button 501 on the job setting screen in a job designation process will be described with reference to FIG. 8.

Figure 8:
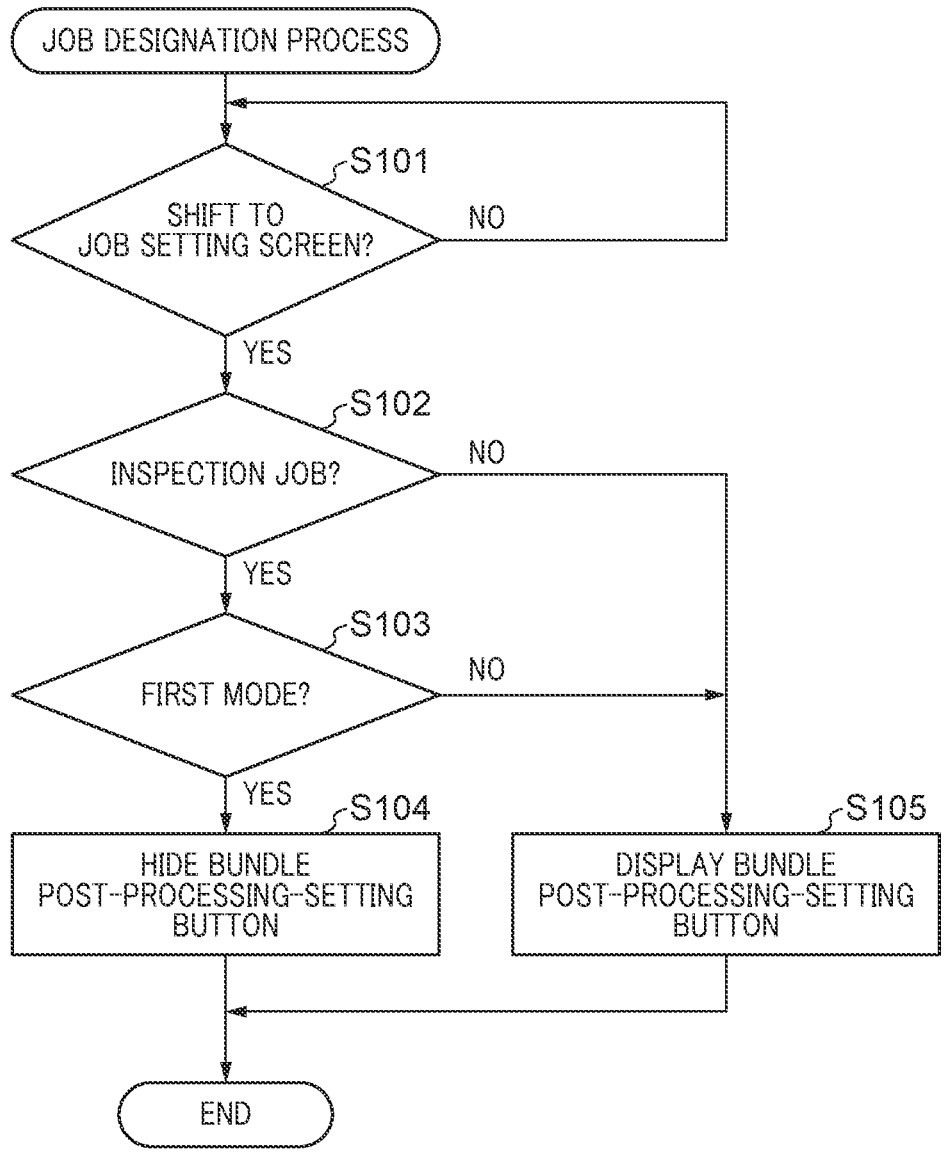
FIG. 8 is a flowchart of a job designation process.

FIG. 8 is a flowchart of the job designation process. This process is realized by the CPU 114 that loads a program stored in the nonvolatile memory 112 or the HDD 115 into the RAM 113 and executes the loaded program. This process is started when the printing apparatus 100 is powered on. In this process, the CPU 114 plays the role of a controller in the present disclosure.

First, in a step S101, the CPU 114 remains on standby until a predetermined operation for shifting to the job setting screen is performed by a user, and when the predetermined operation is performed, the CPU 114 proceeds to a step S102. In the step S102, the CPU 114 determines whether or not a job to be designated is an inspection job for carrying out sheet inspection according to the settings of the above-mentioned inspection area and the inspection items, set for the inspection apparatus 150.

If it is determined in the step S102 that the job to be designated is not an inspection job, in a step S105, the CPU 114 displays the job setting screen 500 (see FIG. 6) on the console panel 120. Therefore, the bundle post-processing-setting button 501 is displayed. This is because in a case where the job is not an inspection job, there is no fear that a print product has any missing sheet.

If it is determined in the step S102 that the job to be designated is an inspection job, in a step S103, the CPU 114 refers to the nonvolatile memory 112 to determine whether or not the set sheet discharge mode is the first mode. Then, if the set sheet discharge mode is not the first mode, but the second mode, the CPU 114 executes the step S105. Therefore, the job setting screen 500 including the bundle post-processing-setting button 501 is displayed. This is because even when the job is an inspection job, there is no fear that a print product has any missing sheet.

If it is determined in the step S103 that the set sheet discharge mode is the first mode, in a step S104, the CPU 114 displays the job setting screen 700 (see FIG. 7) on the console panel 120. Therefore, the bundle post-processing-setting button 501 is not displayed. That is, the CPU 114 controls the console panel 120 as a designation portion so as to inhibit a job including bundle post-processing from being designated. With this, an inspection job including bundle post-processing is prevented from being executed in the first mode, and hence it is possible to avoid missing of any sheet from a print product. After execution of the steps S104 and S105, the CPU 114 terminates the job designation process in FIG. 8.

According to the present embodiment, in the case where the first mode is set, the CPU 114 performs control for inhibiting a job including bundle post-processing from being designated (see the step S104 and FIG. 7). This makes it possible to prevent delivery of a print product formed by binding a bundle from which a sheet or some sheets is/are missing.

On the other hand, in the case where the second mode is set, the CPU 114 performs control for permitting a job including bundle post-processing to be designated (see step S105 and FIG. 6). Further, in the second mode, after discharge of all already fed sheets is completed, the job operation is resumed from a point corresponding to the defective sheet. Therefore, in the second mode, a job including bundle post-processing can be designated, and it is possible to realize delivery of a print product having no missing sheet, by resuming the job.

Further, in a case where the CPU 114 performs control for permitting a job including bundle post-processing to be designated, the CPU 114 displays the bundle post-processing-setting button 501 on the job setting screen 500 (see FIG. 6). On the other hand, in a case where the CPU 114 performs control for inhibiting a job including bundle post-processing from being designated, the CPU 114 does not display the bundle post-processing-setting button 501 on the job setting screen 700 (see FIG. 7). With this, it is possible to positively prevent a user from erroneously designating a job including bundle post-processing and make the user aware that a job including bundle post-processing cannot be designated.

Note that the method of performing control for inhibiting a job including bundle post-processing from being designated in a case where the first mode is set is not limited to the method of preventing the bundle post-processing-setting button 501 from being displayed. For example, even when designation of such a job is input, this designation may be rejected (or canceled) and this fact may be notified to the user.

Next, a second embodiment of the present disclosure will be described. In the first embodiment, in a case where the first mode is set in the step of designating a job, designation of a job including bundle post-processing is inhibited. In contrast, in the second embodiment of the present disclosure, in a case where an inspection job including bundle post-processing is designated, execution of the job in the first mode is controlled to be stopped (inhibited). Other basic configurations in the present embodiment are the same as those of the first embodiment.

Figure 9:
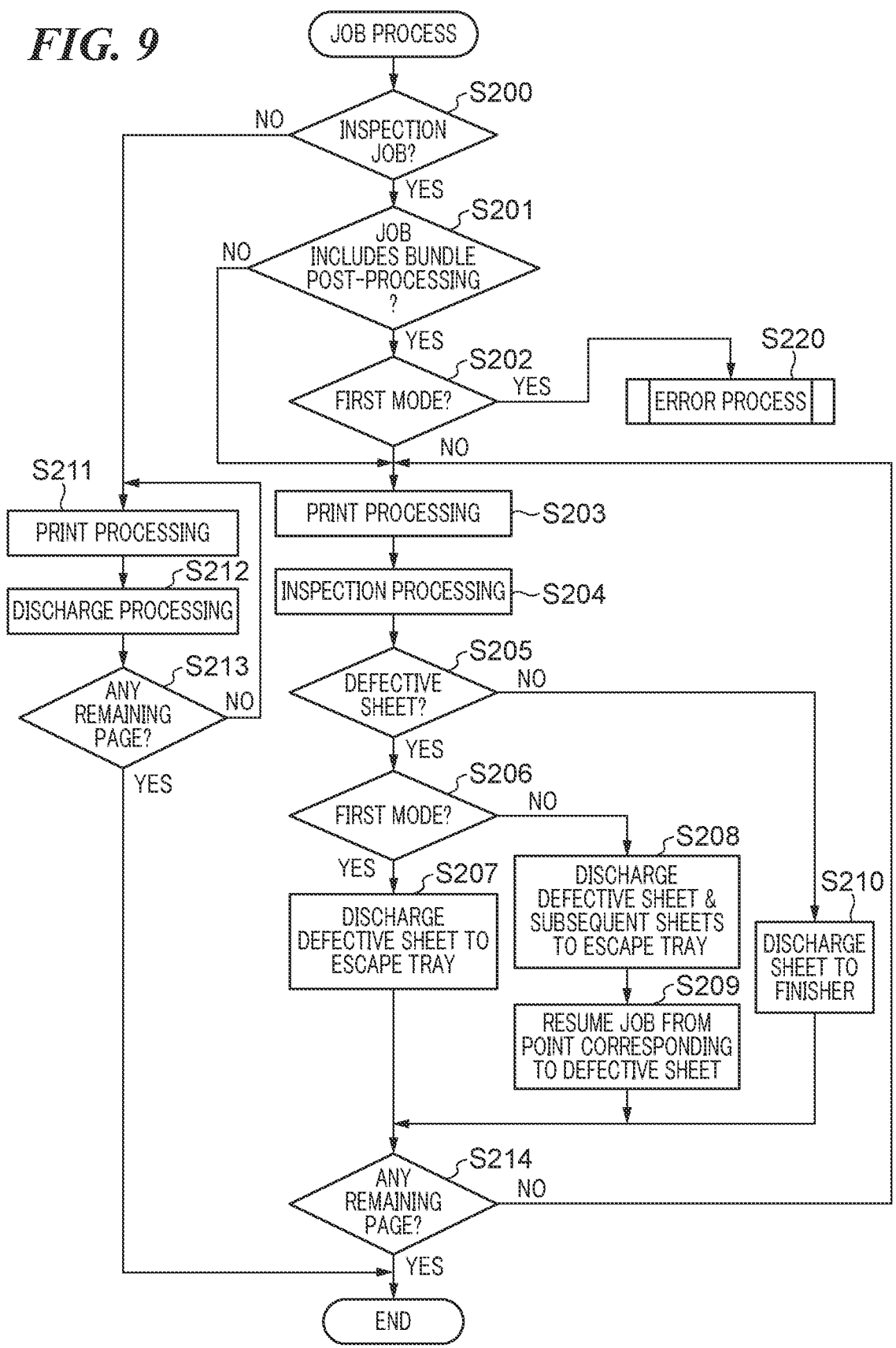
FIG. 9 is a flowchart of a job process.

FIG. 9 is a flowchart of a job process. This process is realized by the CPU 114 that loads a program stored in the nonvolatile memory 112 or the HDD 115 into the RAM 113 and executes the loaded program. This process is started when a job is input. In this process, the CPU 114 plays the role of the controller in the present disclosure.

In the present embodiment, a system is envisaged in which inspection areas and inspection items can be set from the console section of the inspection apparatus 150 but the host computer 101 cannot grasp the settings of the inspection areas and the inspection items. In this case, it is necessary to avoid execution of a job including bundle post-processing in the first mode based on determination performed not by the host computer 101, but by the printing apparatus 100.

First, in a step S200, the CPU 114 determines whether or not an input job is an inspection job. Then, if the input job is not an inspection job, the CPU 114 executes print processing in a step S211 and executes processing for discharging the sheet to the finisher 250 in a step S212. In a step S213, the CPU 114 determines whether or not there is a remaining page to be processed next in the job. If there is a remaining page to be processed next, the CPU 114 returns to the step S211, whereas if there is no remaining page to be processed next, the CPU 114 terminates the process in FIG. 9. Therefore, in the steps S211 to S212, print processing and discharge processing are executed for all pages of the job.

If it is determined in the step S200 that the input job is an inspection job, in a step S201, the CPU 114 determines whether or not the input job includes bundle post-processing. Then, if the input job does not include bundle post-processing, there is no fear that one sheet or some sheets is/are missing from the resulting print product, and hence the CPU 114 proceeds to a step S203. If the input job includes bundle post-processing, the CPU 114 refers to the nonvolatile memory 112 in a step S202 to determine whether or not the set sheet discharge mode is the first mode.

Then, if the set sheet discharge mode is not the first mode, but the second mode, there is no fear that one sheet or some sheets come to be missing from the print product, and hence the CPU 114 proceeds to the step S203. However, if the set sheet discharge mode is the first mode, there is a fear that one sheet or some sheets come to be missing from the print product, and hence the process proceeds to a step S220 to execute an error process (see FIG. 10), described hereinafter.

In the step S203, the CPU 114 performs print processing on a sheet, and in a step S204, the CPU 114 executes inspection processing on an image of the printed sheet using the inspection apparatus 150. In a step S205, as a result of the image inspection performed by the inspection apparatus 150, the CPU 114 determines whether or not the inspected sheet is a defective sheet. If the inspected sheet is not a defective sheet, but a normal sheet, in a step S210, the CPU 114 discharges the inspected sheet to the finisher 250 and proceeds to a step S214. Note that although in the present embodiment, the finisher 250 is set as the first discharge destination by way of example, similar to the first embodiment, the lift table 242 of the stacker 240 may be set as the first discharge destination.

In the step S214, the CPU 114 determines whether or not there is a remaining sheet to be processed next. If there is a remaining sheet to be processed next, the CPU 114 returns to the step S203. If there is no remaining sheet to be processed next, the CPU 114 terminates the process in FIG. 9.

If it is determined in the step S205 that the inspected sheet is a defective sheet, in a step S206, the CPU 114 refers to the nonvolatile memory 112 to determine whether or not the set sheet discharge mode is the first mode. Then, if the set sheet discharge mode is the first mode, in a step S207, the CPU 114 discharges the defective sheet to the escape tray 246 of the stacker 240 as the second discharge destination, and proceeds to the step S214. If the set sheet discharge mode is not the first mode, but the second mode, in a step S208, the CPU 114 discharges the defective sheet and subsequent sheets (all already fed sheets following the defective sheet) to the escape tray 246 of the stacker 240. In this case, the sheets following the defective sheet are discharged to the escape tray 246 without being printed and inspected. In a step S209, the CPU 114 resumes the job from a point corresponding to the defective sheet and proceeds to the step S214.

Figure 10:
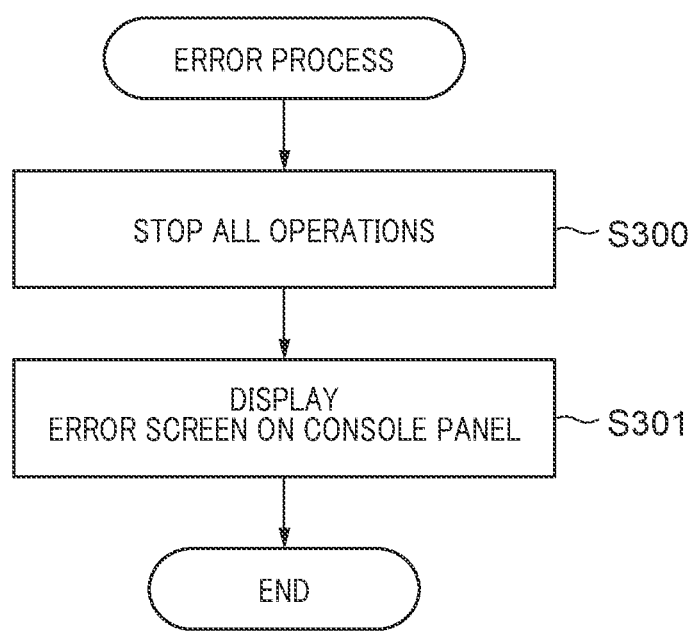
FIG. 10 is a flowchart of an error process.

FIG. 10 is a flowchart of the error process executed in the step S220 in FIG. 9. Transition to this process occurs in a case where an inspection job including bundle post-processing is input and the first mode is set. If print processing and inspection processing are executed in this case, since a defective sheet is excluded, there is a fear that a bundle from which one sheet or some sheets is/are missing is delivered as a print product. This is a print product which is not desired by the user. To cope with this, the CPU 114 performs the error process to stop this job.

Figure 11:
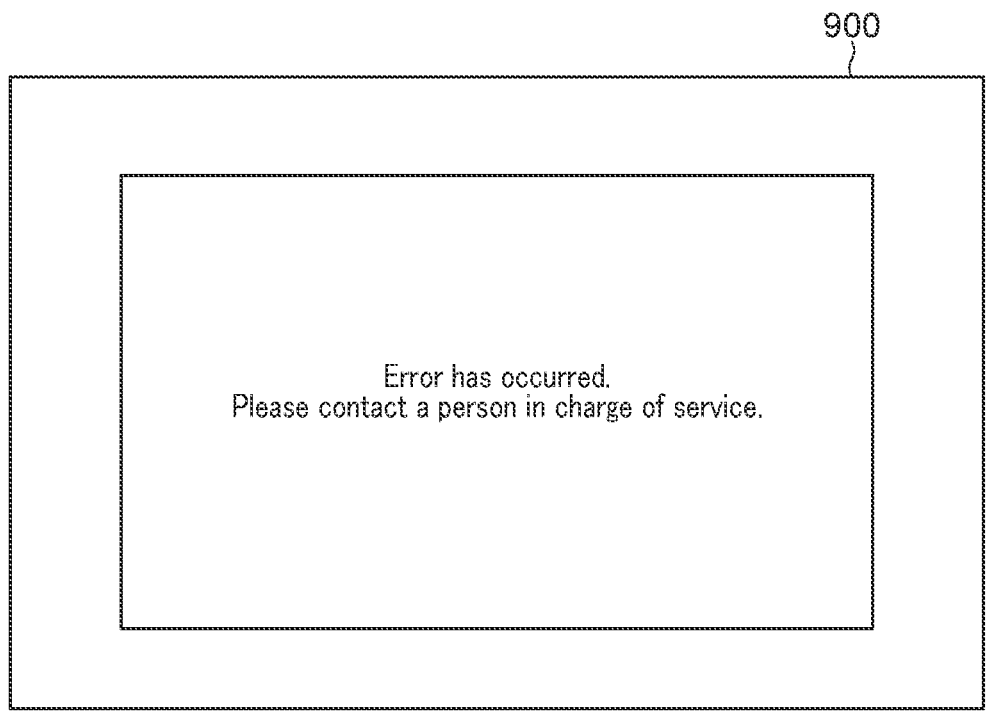
FIG. 11 is a diagram showing an example of an error screen.

In a step S300, the CPU 114 stops all operations including the conveying operation, the image forming operation, and the fixing operation. In a step S301, the CPU 114 executes notification processing, followed by terminating the process in FIG. 10. More specifically, the CPU 114 displays an error screen 900 shown in FIG. 11, by way of example, on the console panel 120. This makes it possible to notify the user that the job cannot be executed. Note that in a case where the error process is performed, when the user powers off and then powers on the printing apparatus 100, the error state is released.

According to the present embodiment, in the case where the first mode is set, and a job including bundle post-processing is designated, the CPU 114 performs control for stopping execution of the job (see FIG. 10). With this, it is possible to obtain the same advantageous effects as provided by the first embodiment in preventing delivery of a print product generated by binding a bundle from which one sheet or some sheets are missing. On the other hand, in a case where the second mode is set, even when a job includes bundle post-processing, the CPU 114 executes the job (step S203). That is, in the case where the second mode is set, and a job including bundle post-processing is designated, the CPU 114 performs control for permitting execution of the job.

Further, in a case where execution of a job including bundle post-processing is stopped, since the CPU 114 stops all operations including the image forming operation, it is possible to reduce wasteful print processing and waste of sheets. In the case where execution of a job including bundle post-processing is stopped, since this fact is notified, it is possible to notify the user that the present job is not executed in the first mode.

Further, in the second mode, after discharge of all already fed sheets is completed, the job operation is resumed from a point corresponding to the defective sheet, and hence it is possible to realize delivery of a print product from which no sheet is missing, by resuming printing.

To perform control for stopping execution of the job including bundle post-processing in the first mode, at least the image forming operation performed by the image forming unit 200 may be stopped. In the present embodiment, the user can make settings of the sheet discharge mode and settings of binding processing, by using the host computer 101. In this case, the CPU 114 functions as a reception portion that receives the setting of the sheet discharge mode and the setting of binding processing from the host computer 101. Further, in a case where the first mode is set as the sheet discharge mode and also binding processing is set, from a PC used by the user, the host computer 101 may stop transmission of the job to the image forming system 1000.

Note that in the above-described embodiments, the inspection apparatus 150 and the printing apparatus 100 may be integrally formed, and for example, the function of the inspection apparatus 150 may be provided within the printing apparatus 100. For example, the inspection apparatus 150 as the inspection portion may be included in the printer engine 130. Therefore, the cameras 231 and 232 may form components of the inspection apparatus 150. The printing apparatus 100 may be referred to as the image forming apparatus. Alternatively, the image forming system 1000 may be referred to as the image forming apparatus.

The present invention has been described heretofore based on the embodiments thereof. However, the present disclosure is not limited to these embodiments, but it is to be understood that the present disclosure includes a variety of forms within the scope of the gist of the present invention. Further, the embodiments of the present invention are described only by way of example, and it is possible to combine components of the embodiments on an as-needed basis. According to the present disclosure, it is possible to prevent delivery of a print product generated by binding a bundle of sheets from which one or some sheets is/are missing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-008889, filed Jan. 22, 2021, which is hereby incorporated by reference herein in its entirety.

What is claimed is:

1. An image forming system comprising:
   an image forming portion configured to form an image on a sheet;
   an inspection portion configured to inspect an image on a sheet delivered from the image forming portion;

a first setting portion configured to set a first mode in which a first sheet determined as normal by the inspection portion is discharged to a first discharge destination, a second sheet determined as not normal by the inspection portion is discharged to a second discharge destination different from the first discharge destination, and a third sheet conveyed subsequently to the second sheet, which is determined as normal by the inspection portion, is discharged to the first discharge destination;

a second setting portion configured to set binding processing for binding a plurality of sheets as one bundle; and a controller configured to stop execution of a job in a case where the first setting portion sets the first mode and also the second setting portion sets the binding processing.

2. The image forming system according to claim 1, wherein the first setting portion is configured to set a second mode in which the first sheet determined as normal by the inspection portion is discharged to the first discharge destination, and the second sheet determined as not normal by the inspection portion and the third sheet conveyed subsequently to the second sheet are discharged to the second discharge destination different from the first discharge destination, and wherein the controller permits execution of the job in a case where the first setting portion sets the second mode and also the second setting portion sets the binding processing.

3. The image forming system according to claim 2, wherein the second mode is a mode in which after a defective sheet determined as not normal by the inspection portion is discharged to the second discharge destination, printing is resumed from an image printed on the defective sheet.

4. The image forming system according to claim 1, wherein in a case where the controller stops execution of the job including the binding processing, the controller stops at least an image forming operation performed by the image forming portion.

5. The image forming system according to claim 1, wherein in a case where the controller stops execution of the job including the binding processing, the controller notifies a user of this fact.

6. The image forming system according to claim 1, wherein the first discharge destination is provided in a stacker disposed at a location downstream of a position where an image on the sheet is read.

7. The image forming system according to claim 6, wherein the first discharge destination is a post-processing apparatus disposed at a location downstream of the position where an image on the sheet is read.

8. The image forming system according to claim 6, wherein the second discharge destination is provided in a stacker.

9. An image forming system comprising:
an image forming portion configured to form an image on a sheet;
an inspection portion configured to inspect an image on a sheet output from the image forming portion;
a first setting portion configured to set a first mode in which a first sheet determined as normal by the inspection portion is discharged to a first discharge destination, a second sheet determined as not normal by the inspection portion is discharged to a second discharge destination different from the first discharge destination, and a third sheet conveyed subsequently to the second sheet, which is determined as normal by the inspection portion, is discharged to the first discharge destination;

a second setting portion configured to set binding processing for binding a plurality of sheets as one bundle; and a controller configured to control the second setting portion such that the second setting portion is disabled from setting the binding processing in a case where the first setting portion sets the first mode.

10. The image forming system according to claim 9, wherein the first setting portion is configured to set a second mode in which the first sheet determined as normal by the inspection portion is discharged to the first discharge destination, and the second sheet determined as not normal by the inspection portion and the third sheet conveyed subsequently to the second sheet are discharged to the second discharge destination different from the first discharge destination, and wherein the controller controls the second setting portion such that the second setting portion is enabled to set the binding processing in a case where the first setting portion sets the second mode.

11. The image forming system according to claim 10, wherein the second mode is a mode in which after a defective sheet determined as not normal by the inspection portion is discharged to the second discharge destination, printing is resumed from an image printed on the defective sheet.

12. The image forming system according to claim 9, wherein the controller controls the second setting portion such that the second setting portion is enabled to designate a job including the binding processing, by displaying a button for enabling the binding processing on a screen for designating a job to be executed, and controls the second setting portion such that the second setting portion is disabled from designating the job including the binding processing, by not displaying the button on the screen.

13. A method of controlling an image forming system including an image forming portion configured to form an image on a sheet, and an inspection portion configured to inspect an image on a sheet delivered from the image forming portion, comprising:
first receiving for receiving setting of a mode in which a first sheet determined as normal by the inspection portion is discharged to a first discharge destination, a second sheet determined as not normal by the inspection portion is discharged to a second discharge destination different from the first discharge destination, and a third sheet conveyed subsequently to the second sheet, which is determined as normal by the inspection portion, is discharged to the first discharge destination;
second receiving for receiving setting of binding processing for binding a plurality of sheets as one bundle; and
controlling for stopping execution of transmission of a job to the image forming system, in a case where, in the first receiving, there is received setting of the mode and also in the second receiving, there is received setting of the binding processing.

14. A method of controlling an image forming system including an image forming portion configured to form an image on a sheet, and an inspection portion configured to inspect an image on a sheet delivered from the image forming portion, comprising:
first receiving for receiving setting of a mode in which a first sheet determined as normal by the inspection portion is discharged to a first discharge destination, a second sheet determined as not normal by the inspection portion is discharged to a second discharge destination different from the first discharge destination, and a third sheet conveyed subsequently to the second sheet, which is determined as normal by the inspection portion, is discharged to the first discharge destination;

second receiving for receiving setting of binding processing for binding a plurality of sheets as one bundle; and controlling for disabling, in the second receiving, receiving the setting of the binding processing, in a case where, in the first receiving, there is received setting of the mode.

15. A non-transitory computer-readable medium storing a program for causing an information processing apparatus to execute a method of controlling an image forming system including an image forming portion configured to form an image on a sheet, and an inspection portion configured to inspect an image on a sheet delivered from the image forming portion, wherein the method comprises:

first receiving for receiving setting of a mode in which a first sheet determined as normal by the inspection portion is discharged to a first discharge destination, a second sheet determined as not normal by the inspection portion is discharged to a second discharge destination different from the first discharge destination, and a third sheet conveyed subsequently to the second sheet, which is determined as normal by the inspection portion, is discharged to the first discharge destination;

second receiving for receiving setting of binding processing for binding a plurality of sheets as one bundle; and controlling for stopping execution of transmission of a job to the image forming system, in a case where, in the first receiving, there is received setting of the mode and also in the second receiving, there is received setting of the binding processing.

16. A non-transitory computer-readable medium storing a program for causing an information processing apparatus to execute a method of controlling an image forming system including an image forming portion configured to form an image on a sheet, and an inspection portion configured to inspect an image on a sheet delivered from the image forming portion, wherein the method comprises:

first receiving for receiving setting of a mode in which a first sheet determined as normal by the inspection portion is discharged to a first discharge destination, a second sheet determined as not normal by the inspection portion is discharged to a second discharge destination different from the first discharge destination, and a third sheet conveyed subsequently to the second sheet, which is determined as normal by the inspection portion, is discharged to the first discharge destination;

second receiving for receiving setting of binding processing for binding a plurality of sheets as one bundle; and controlling for disabling, in the second receiving, receiving the setting of the binding processing, in a case where, in the first receiving, there is received setting of the mode.

* * * * *